United States Patent Office 2,952,587
Patented Sept. 13, 1960

2,952,587

BIOLOGICAL TRANSFORMATION OF ANHYDROTETRACYCLINES TO 5α(11α)-DEHYDROTETRACYCLINES

Philip Andrew Miller and Jerry Robert Daniel McCormick, New City, N.Y., assignors to American Cyanamid Company, New York, N.Y., a corporation of Maine No Drawing. Filed Apr. 6, 1960, Ser. No. 20,269

4 Claims. (Cl. 195—80)

This invention relates to a new process for producing 5α(11α)-dehydrotetracyclines and, more particularly is concerned with a novel process for biologically transforming anhydrotetracyclines to 5α(11α)-dehydrotetracyclines as set forth in the following reaction scheme:

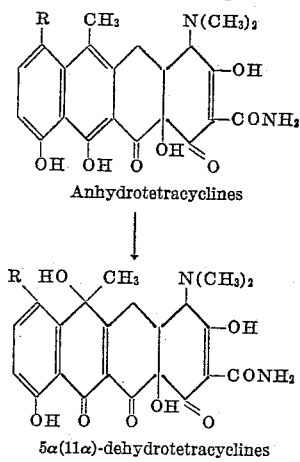

wherein R is a member of the group consisting of hydrogen, bromine and chlorine.

The 5α(11α)-dehydrotetracyclines are new members of the tetracycline family described in the copending application of Growich and Miller, Serial No. 650,821, filed April 5, 1957, now abandoned. They have been produced by aerobically fermenting an aqueous nutrient medium with certain new mutant strains of S. aureofaciens, the morphological and cultural characteristics of which are adequately described in the aforesaid Growich et al. application. In addition, viable cultures of these new mutant strains of S. aureofaciens, which have been designated as S1308, S1308–29, S1308–V146, S1308–V237, and E–504, have been deposited with the American Type Culture Collection in Washington, D.C., and have been assigned ATCC accession numbers 12,748, 12,749, 12,750, 12,751 and 13,191 respectively.

The 5α(11α)-dehydrotetracyclines possess little or no biological activity. However, since the new mutant strains of S. aureofaciens are high-producing strains frequently producing as much as 9,000–10,000 gammas per milliliter of 7-chloro-5α(11α)-dehydrotetracycline, considerable effort has been directed towards converting the 5α(11α)-dehydrotetracyclines into compounds possessing the desired typical broad-spectrum antibacterial activity. One method for accomplishing this result is based upon the discovery that it is possible to catalytically reduce the 5α(11α)-dehydrotetracyclines in good yield with hydrogen in the presence of a noble metal catalyst to the broad spectrum antibiotic tetracycline. A suitable reduction process is described in the copending application of Miller, Serial No. 650,822, filed April 5, 1957. Another method for accomplishing this desired result resides in the discovery that it is possible to effect a biological conversion of the 5α(11α)-dehydrotetracyclines under suitable fermentation conditions to the broad-spectrum antibiotics chlortetracycline or tetracycline. A suitable process is described in the copending application of McCormick, Sjolander and Hirsch, Serial No. 650,820, filed April 5, 1957. As described in that application, the biological conversion may be effected by the addition of a 5α(11α)-dehydrotetracycline compound to a fermentation medium employing a conventional chlortetracycline-synthesizing and tetracycline-synthesizing strain of S. aureofaciens such as the original strain of S. aureofaciens A377 described in United States Patent to Duggar, No. 2,782,055 and deposited at the Northern Regional Research Laboratories, Peoria, Illinois as NRRL 2209.

The anhydrotetracyclines, the starting materials for the novel process of the present invention, are well known compounds. Anhydrochlorotetracycline is described in United States Patent No. 2,744,931 to Broschard et al., and anhydrotetracycline is described in United States Patent No. 2,744,932 to Waller et al. In addition, the synthesis of dedimethylamino-12α-deoxy-6-demethylanhydrochlorotetracycline has been described by J. H. Boothe et al., J.A.C.S. 81, 1006 (1959). The anhydrotetracyclines exhibit antimicrobial activity particularly against certain strains of bacteria which are resistant to the tetracyclines.

Our invention is based upon the discovery that it is possible to effect a biological transformation of the anhydrotetracyclines to the 5α(11α)-dehydrotetracyclines. This transformation is accomplished by adding an anhydrotetracycline compound to a fermentation medium inoculated with a strain of S. aureofaciens which is capable of producing some one of the 5α(11α)-dehydrotetracyclines, for instance, strain S1308 (ATCC 12748), a producer of 7-chloro-5α(11α)-dehydrotetracycline. After fermenting for a suitable time, for example, from 24 to 96 hours, it is found that the conversion of the anhydrotetracycline to the corresponding 5α(11α)-dehydrotetracycline is about 75% complete.

It is most surprising that the anhydrotetracyclines can serve as substrates which can be acted upon by the microorganism so as to transform the anhydrotetracycline compounds to the corresponding 5α(11α)-dehydrotetracyclines. In the normal fermentation the ingredients of the nutrient medium serve as the substrate from which the antibiotic is synthesized. It is unexpected to discover that a known stable chemical compound may serve as the substrate for producing an entirely different tetracycline compound.

The conditions of the fermentation for the biological conversion of the anhydrotetracyclines to the 5α(11α)-dehydrotetracyclines are generally the same as set forth in the aforesaid Growich et al. application and which, in turn, are generally the same as for the presently known methods of producing chlortetracycline by fermentation. That is, the fermentation medium contains the usual nutrients and mineral substances. Suitable nutrients include starch, dextrose, cane sugar, glucose, molasses, soybean meal, peanut meal, yeast, meat extracts, peptone, urea, corn steep liquor, distillers solubles, fish meal and other conventional substances. The inorganic salts include such things as calcium carbonate, ammonium sulfate, ammonium chloride, and salts of the various trace elements such as manganese, cobalt, zinc, copper, iron and the like.

The other general conditions of the fermentation, such as hydrogen ion concentration, temperature, time, rate of aeration, preparation of the inoculum, sterilization, inoculation and the like are conventional and are similar to those for the production of chlortetracycline shown in the U.S. Patent No. 2,482,055 to Duggar.

After the fermentation has been continued for the desired period of time and the transformation of the anhydrotetracycline compound to the corresponding $5\alpha(11\alpha)$-dehydrotetracycline is substantially complete, the $5\alpha(11\alpha)$-dehydrotetracycline compound may be isolated from the fermentation mash in any convenient manner. A suitable recovery process is described in the aforesaid Growich et al. application which, briefly, consists in acidifying the fermentation liquor by adjusting the pH to from 1 to 2 with a mineral acid, filtering the mash, and extracting the aqueous filtrate with an alcohol, such as n-butanol. The extract is then chromatographed on a column in the usual manner and the column is developed with a mixture of 80% n-butanol and 20% chloroform. The eluted fractions are concentrated and freeze-dried. The freeze-dried material is dissolved in methanol and crystallization of the $5\alpha(11\alpha)$-dehydrotetracycline compound as the free base takes place rapidly. The crystals are filtered, washed and dried, and may be recrystallized from alcohol in a standard manner.

The invention will be described in greater detail in conjunction with the following specific examples.

*Example 1*

Spores of a strain of *S. aureofaciens* (S1308, ATCC No. 12,748) are used to inoculate 100 milliliters of a sterile medium prepared according to the following formulation:

| Ingredients: | Amounts, grams |
|---|---|
| Sucrose | 30 |
| Ammonium sulfate | 2 |
| Calcium carbonate | 7 |
| Corn steep liquor | 20 |
| Tap water q.s., 1000 milliliters. | |

After incubation at 26.5° C. for 24 hours, 1 milliliter portions of this inoculum are used to seed 25 milliliters of a sterile medium prepared according to the following formulation:

| Ingredients: | Amounts, grams |
|---|---|
| Ammonium sulfate | 5 |
| Calcium carbonate | 9 |
| Ammonium chloride | 1.5 |
| Magnesium chloride.6H$_2$O | 2 |
| Ferrous sulfate.7H$_2$O | 12 |
| Manganese sulfate.4H$_2$O | 10 |
| Cobalt chloride.6H$_2$O | 1 |
| Zinc sulfate.7H$_2$O | 20 |
| Corn steep liquor | 25–30 |
| Starch | 55 |
| Water q.s., 1000 milliliters. | |

This inoculated medium is incubated at 25° C. on a rotary shaker for 48 hours.

Three milliliter portions of the mash are transferred to 20 x 150 mm. sterile shaker tubes containing 1.5 milligrams of C$^{14}$-labeled anhydrochlortetracycline. The tubes are mounted on a reciprocating shaker and allowed to incubate for an additional 72 hours at 25° C. The tubes are then removed, the mash in each diluted with 10 milliliters of 0.1 N hydrochloric acid, and the mycelium removed by filtration. The filtrate is extracted by shaking with 0.5 milliliter of n-chlorophenol. Five microliters of the phenol phase are spotted on a sheet of Whatman No. 1 chromatographic paper which is previously buffered by dipping in 0.3 M NaH$_2$PO$_4$ solution adjusted to pH 3.0 with phosphoric acid, and then air dried. The strip is then developed for 18 hours with n-butanol which is saturated with the phosphate solution described above. The air-dried chromatogram is scanned for radioactivity and shows the disappearance of C$^{14}$-anhydrochlortetracycline ($R_f$ 0.70) and the concomitant appearance of C$^{14}$-7-chloro-$5\alpha(11\alpha)$-dehydrotetracycline ($R_f$ 0.44).

*Example 2*

The procedure of the preceding example is repeated using a vegetative inoculum of *S. aureofaciens* (strain S1308, ATCC No. 12,748) except that 1.5 milligrams of C$^{14}$-labeled anhydrotetracycline ($R_f$ 0.60) is used instead of the anhydrochlortetracycline used in Example 1. The fermentation is carried out as described in Example 1 and paper strip chromatography shows the presence of C$^{14}$-$5\alpha(11\alpha)$-dehydrotetracycline ($R_f$ 0.37).

*Example 3*

The procedure of Example 1 is repeated using a vegetative inoculum of *S. aureofaciens* (strain E–504, ATCC No. 13,191). In addition, 1.5 milligrams of Br$^{82}$-labeled anhydrobromtetracycline ($R_f$ 0.70) is used instead of the anhydrochlortetracycline used in Example 1. The fermentation is carried out as described in Example 1 and paper strip chromatography shows the presence of Br$^{82}$-7-bromo-$5\alpha(11\alpha)$-dehydrotetracycline ($R_f$ 0.44).

We claim:
1. The process for the biological transformation of an anhydrotetracycline to the corresponding $5\alpha(11\alpha)$-dehydrotetracycline which comprises adding an anhydrotetracycline to an aqueous nutrient medium, aerobically fermenting the aqueous nutrient medium with a $5\alpha(11\alpha)$-dehydrotetracycline-producing strain of *S. aureofaciens*, and continuing the fermentation until the anhydrotetracycline is substantially converted to the corresponding $5\alpha(11\alpha)$-dehydrotetracycline.

2. The process for the biological transformation of anhydrotetracycline to $5\alpha(11\alpha)$-dehydrotetracycline which comprises adding crystalline anhydrotetracycline to an aqueous nutrient medium, aerobically fermenting the aqueous nutrient medium with a $5\alpha(11\alpha)$-dehydrotetracycline-producing strain of *S. aureofaciens*, and continuing the fermentation until the anhydrotetracycline is substantially converted to $5\alpha(11\alpha)$-dehydrotetracycline.

3. The process for the biological transformation of anhydrochlortetracycline to 7-chloro-$5\alpha(11\alpha)$-dehydrotetracycline which comprises adding crystalline anhydrochlortetracycline to an aqueous nutrient medium, aerobically fermenting the aqueous nutrient medium with a 7-chloro-$5\alpha(11\alpha)$-dehydrotetracycline-producing strain of *S. aureofaciens*, and continuing the fermentation until the anhydrochlortetracycline is substantially converted to 7-chloro-$5\alpha(11\alpha)$-dehydrotetracycline.

4. The process for the biological transformation of anhydrobromtetracycline to 7-bromo-$5\alpha(11\alpha)$-dehydrotetracycline which comprises adding crystalline anhydrobromtetracycline to an aqueous nutrient medium, aerobically fermenting the aqueous nutrient medium with a 7-bromo-$5\alpha(11\alpha)$-dehydrotetracycline-producing strain of *S. aureofaciens*, and continuing the fermentation until the anhydrobromtetracycline is substantially converted to 7-bromo-$5\alpha(11\alpha)$-dehydrotetracycline.

No references cited.

UNITED STATES PATENT OFFICE

CERTIFICATE OF CORRECTION

Patent No. 2,952,587                                  September 13, 1960

Philip Andrew Miller et al.

It is hereby certified that error appears in the printed specification of the above numbered patent requiring correction and that the said Letters Patent should read as corrected below.

In the heading to the printed specification, line 5, in the title of invention, for "5α(11α)-" read -- 5a(11a)- --; column 1, lines 17, 19, 39, 42 and 57, for "5α(11α)-", each occurrence, read -- 5a(11a)- --; same column 1, lines 61, 63 and 67, for "5α(11α)-", each occurrence, read -- 5a(11a)- --; column 2, lines 3 and 9, for "5α(11α)-", each occurrence, read -- 5a(11a)- --; line 23, for "-12α-deoxy-" read -- -12a-deoxy- --; lines 31, 35 and 37, for "5α(11α)-", each occurrence, read -- 5a(11a)- --; same column 2, lines 40, 45 and 53, for "5α(11α)-", each occurrence, read -- 5a(11a)- --; column 3, lines 5, 6 and 19, for "5α(11α)-", each occurrence, read -- 5a(11a)- --; line 65, for "n-chlorophenol" read -- p-chlorophenol --; column 4, lines 8, 18, 28, 31, 34 and 37, for "5α(11α)-", each occurrence, read -- 5a(11a)- --; same column 4, lines 40, 43, 46 and 48, for "5α(11α)-", each occurrence, read -- 5a(11a)- --; lines 52, 55 and 57, for "5α(11α)-", each occurrence, read -- 5a(11a)- --; lines 61 and 64, for "5α(11α)-", each occurrence, read -- 5a(11a)- --.

Signed and sealed this 18th day of April 1961.

(SEAL)
Attest:
ERNEST W. SWIDER
Attesting Officer

DAVID L. LADD
Commissioner of Patents